(12) United States Patent
Wolkersdorfer et al.

(10) Patent No.: US 6,595,581 B2
(45) Date of Patent: Jul. 22, 2003

(54) VEHICLE FLOOR STRUCTURE AND METHOD OF MAKING SAME

(75) Inventors: Werner Wolkersdorfer, Neuhausen (DE); Christiaan Burgers, Heimsheim (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 0 days.

(21) Appl. No.: 09/999,070

(22) Filed: Dec. 3, 2001

(65) Prior Publication Data

US 2002/0067053 A1 Jun. 6, 2002

(30) Foreign Application Priority Data

Dec. 1, 2000 (DE) .......................... 100 59 912

(51) Int. Cl.⁷ ............................................. B62D 25/20
(52) U.S. Cl. ........................................ 296/204; 296/188
(58) Field of Search ................................. 296/188, 191, 296/204

(56) References Cited

U.S. PATENT DOCUMENTS

| 4,457,555 A | * | 7/1984 | Draper ........................ 296/186 |
| 4,836,600 A | | 6/1989 | Miyazaki et al. |
| 5,002,333 A | * | 3/1991 | Kenmochi et al. .......... 296/204 |
| 5,102,187 A | * | 4/1992 | Harasaki ...................... 296/204 |
| 5,127,704 A | * | 7/1992 | Komatsu ...................... 296/204 |
| 5,611,593 A | * | 3/1997 | Fukagawa et al. .......... 296/204 |
| 6,015,183 A | * | 1/2000 | Vlahovic ...................... 296/204 |
| 6,203,099 B1 | * | 3/2001 | Iwatsuki ...................... 296/204 |
| 6,428,085 B1 | * | 8/2002 | Miyasaka et al. ........... 296/189 |
| 6,460,918 B1 | * | 10/2002 | Sato et al. .................... 296/204 |
| 2001/0028179 A1 | * | 10/2001 | Takemoto et al. ........... 296/204 |

FOREIGN PATENT DOCUMENTS

| DE | 3813455 | 11/1988 |
| DE | 3813455 C2 | 8/1992 |
| EP | 0915006 | 5/1999 |
| JP | 10-203423 | 8/1998 |

OTHER PUBLICATIONS

European Search Report.

* cited by examiner

*Primary Examiner*—D. Glenn Dayoan
*Assistant Examiner*—Jason Morrow
(74) *Attorney, Agent, or Firm*—Crowell & Moring LLP

(57) ABSTRACT

The floor installation structure of a motor vehicle is constructed of two floor sheets connected with each other by a connection unit that has an upper and a lower heel sheet as well as a tunnel segment, which is connectable with a central tunnel.

31 Claims, 6 Drawing Sheets

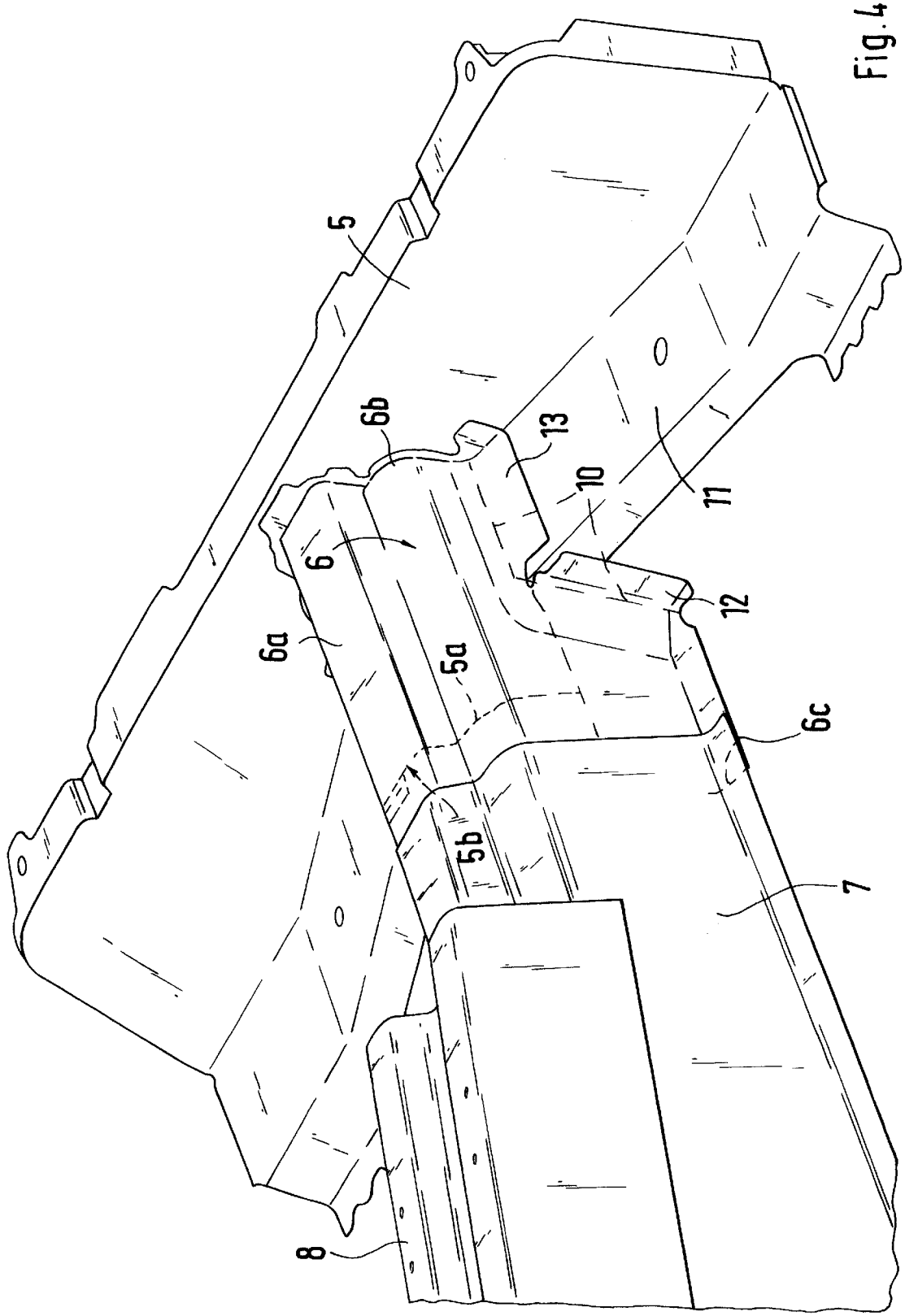

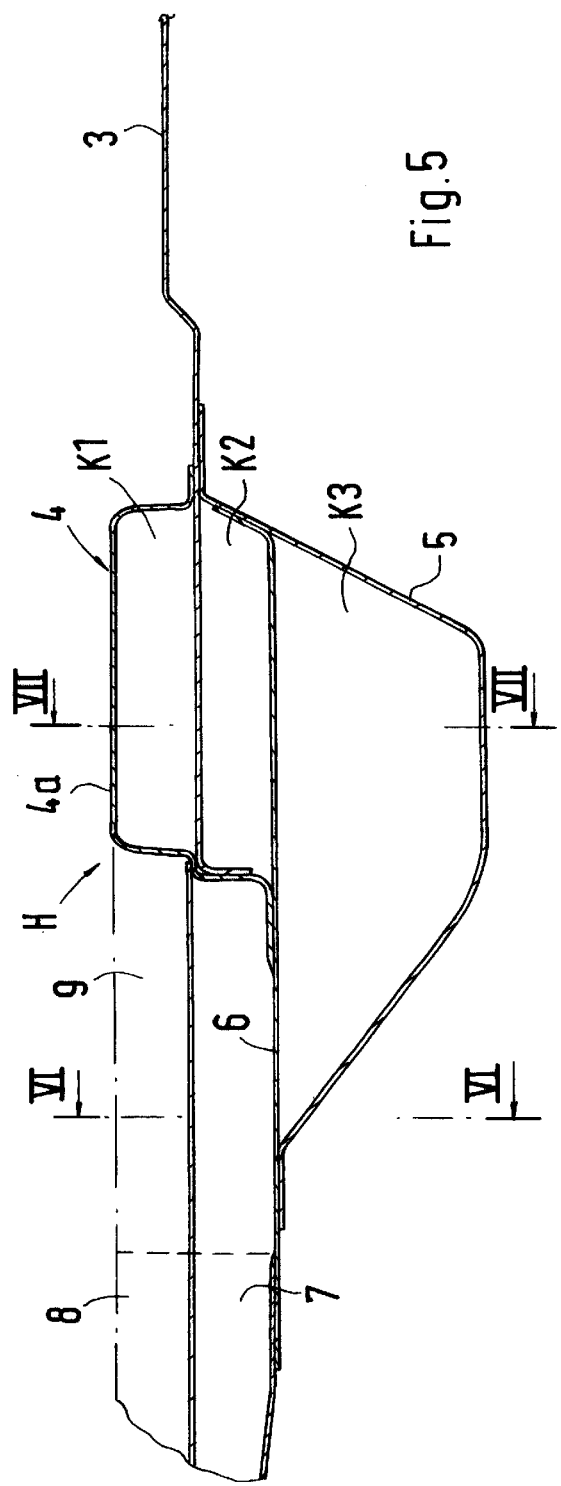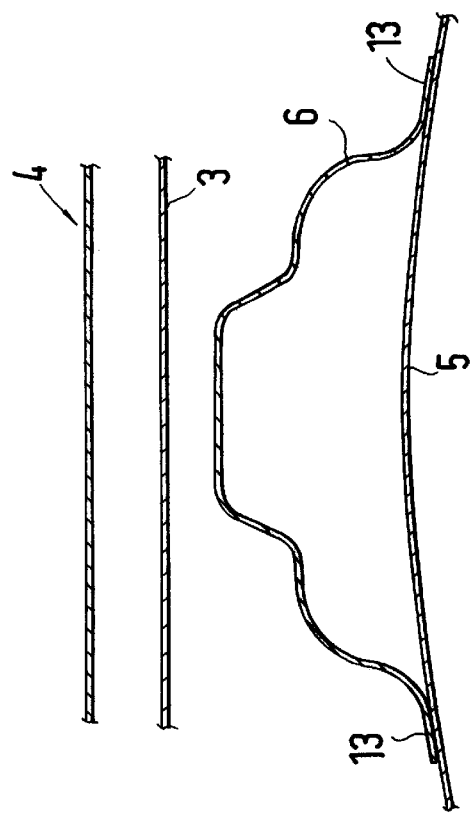

VEHICLE FLOOR STRUCTURE AND METHOD OF MAKING SAME

BACKGROUND AND SUMMARY OF THE INVENTION

This application claims the priority of German Patent Application No. DE 100 59 912.5, filed Dec. 1, 2000, the disclosure of which is expressly incorporated by reference herein.

The invention relates to a motor vehicle with a floor installation structure comprising a central tunnel running longitudinally, which is connected with a floor transverse support of the structure through connection elements.

In German Patent Document DE 38 13 455 C2, and corresponding U.S. Pat. No. 4,836,600, a floor installation structure for a motor vehicle body is known which includes a front and rear floor plate whereby a longitudinally running tunnel is integrated into the front floor plate. The connection of the two floor plates takes place by way of angular stops on the floor plates running crosswise to the motor vehicle which are connected with one another and form a hollow support.

An aspect of the invention is to create a connection between a rear and a front floor sheet of a floor installation structure of a motor vehicle which results in an optimal torsion rigidity of the floor structure, whereby the connection between the floor elements is simple to manufacture and is constructed so it can be assembled.

This aspect is accomplished in accordance with certain preferred embodiments of the invention in that the connection elements for a transverse-running hollow support unit, including plural chambers, with the floor installation structure, and a tunnel segment which connects the central tunnel with the hollow support unit, is held with one free end in the hollow support unit and with a turned-away free end in the central tunnel. Other certain preferred embodiments contain additional advantageous features.

Advantages primarily attained with certain preferred embodiments of the invention are that, in addition to achieving a high torsion rigidity of the floor installation structure, in the event of a frontal impact a favorable introduction of forces into adjacent installation structure takes place. This is accomplished advantageously since the connection elements of the front and rear floor sheet form a transversely running hollow support unit of the floor installation structure and a tunnel segment arranged between the central tunnel, and the hollow support unit is held with its one free end in the hollow support unit and with its other turned-away free end in the central tunnel. This hollow support unit forms several chambers separated from each other through the connection elements.

In order to advantageously construct a stable connection unit between the two floor sheets in front and back, the hollow support unit has an angular heel sheet arranged beneath the floor installation structure or a back-lying floor sheet with a contoured locking segment arranged and moved up in a longitudinal central plane of the central tunnel and a further angular heel sheet arranged above the floor sheet. In this way, the heel sheets are connectable by way of stops with the floor installation structure as well as with one another.

For form-locking centering between the tunnel segment and the lower heel sheet, it is advantageously provided that the tunnel segment has a section with a U-shaped cross section with a projecting U-section arranged in the bar, and that the segment has an angular cutout with mounting straps on the legs and on the front face toward the underlying heel sheet. In this way, the result is that the moved-up contoured locking segment of the lower heel sheet has a contouring corresponding to the contouring of the tunnel segment and is to be arranged form-lockingly within the tunnel segment.

In part, hollow supports arise between the heel sheet or the heel sheet and the floor sheet which bestow upon the connection a relatively great rigidity, preferably transversely, and consequently counteract a torsion of the floor installation structure.

Other objects, advantages and novel features of the present invention will become apparent from the following detailed description of the invention when considered in conjunction with the accompanying drawings.

BRIEF DESCRIPTION OF THE DRAWINGS

FIG. 4 shows a detail of the lower heel sheet with tunnel segment and central tunnel, FIG. 5 shows a section from line V—V of FIG. 2, FIG. 7 shows a section according to line VII—VII of FIG. 5.

DETAILED DESCRIPTION OF THE DRAWINGS

Figure 1:
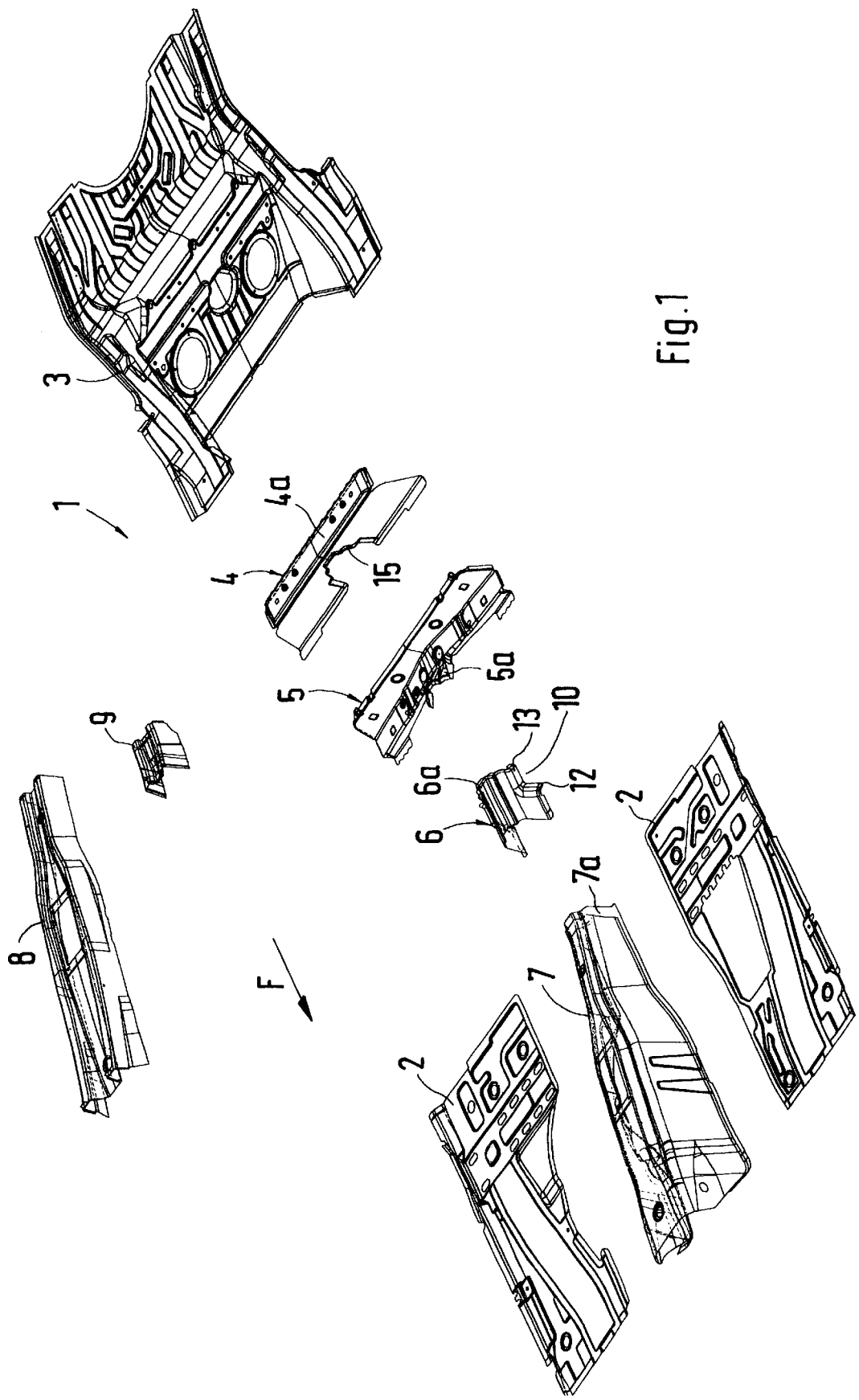
FIG. 1 shows a graphic representation of a floor installation structure with hollow support unit and connection elements.
Figure 2:
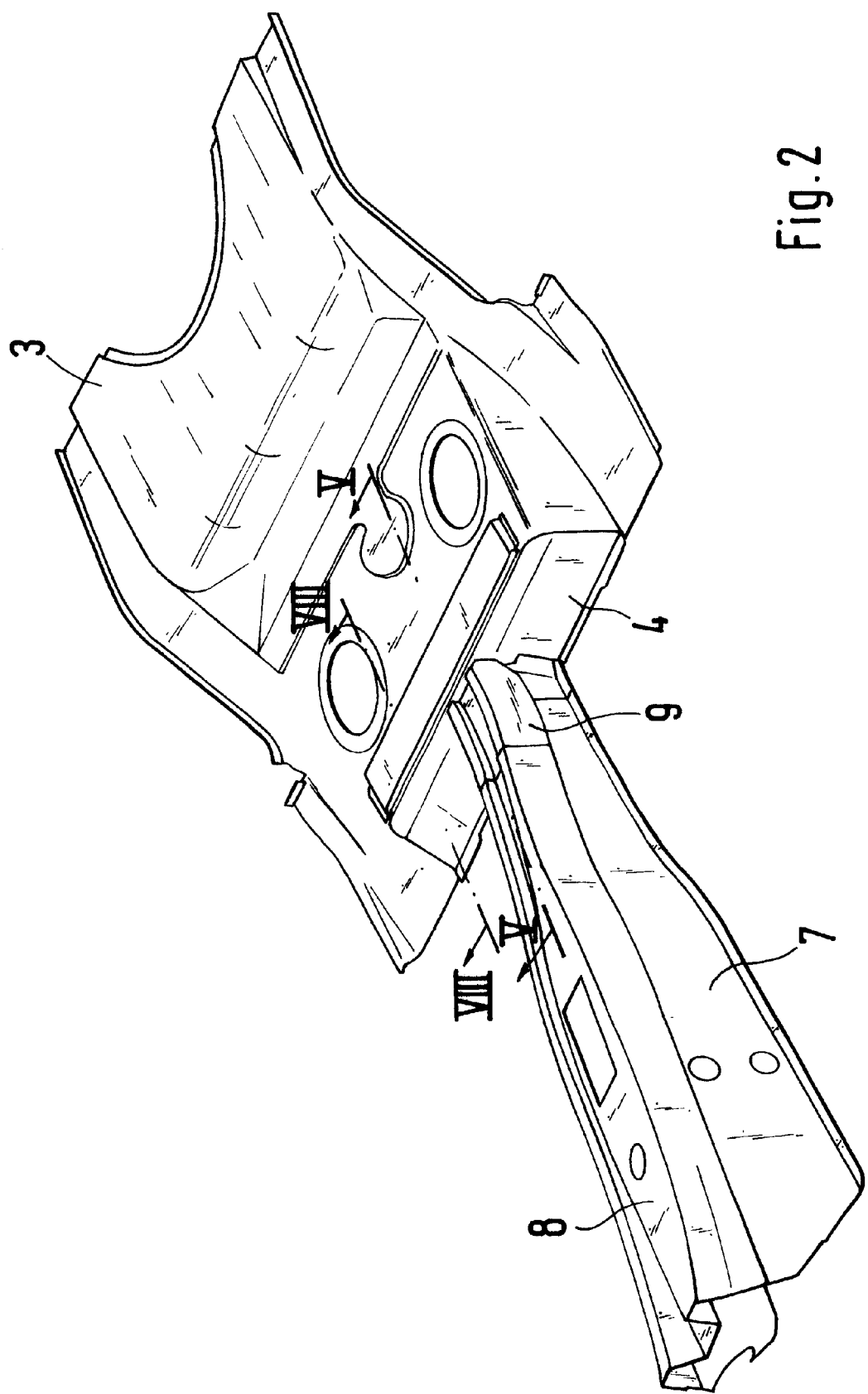
FIG. 2 shows a representation of the central tunnel connected with the rear floor sheet.
Figure 3:
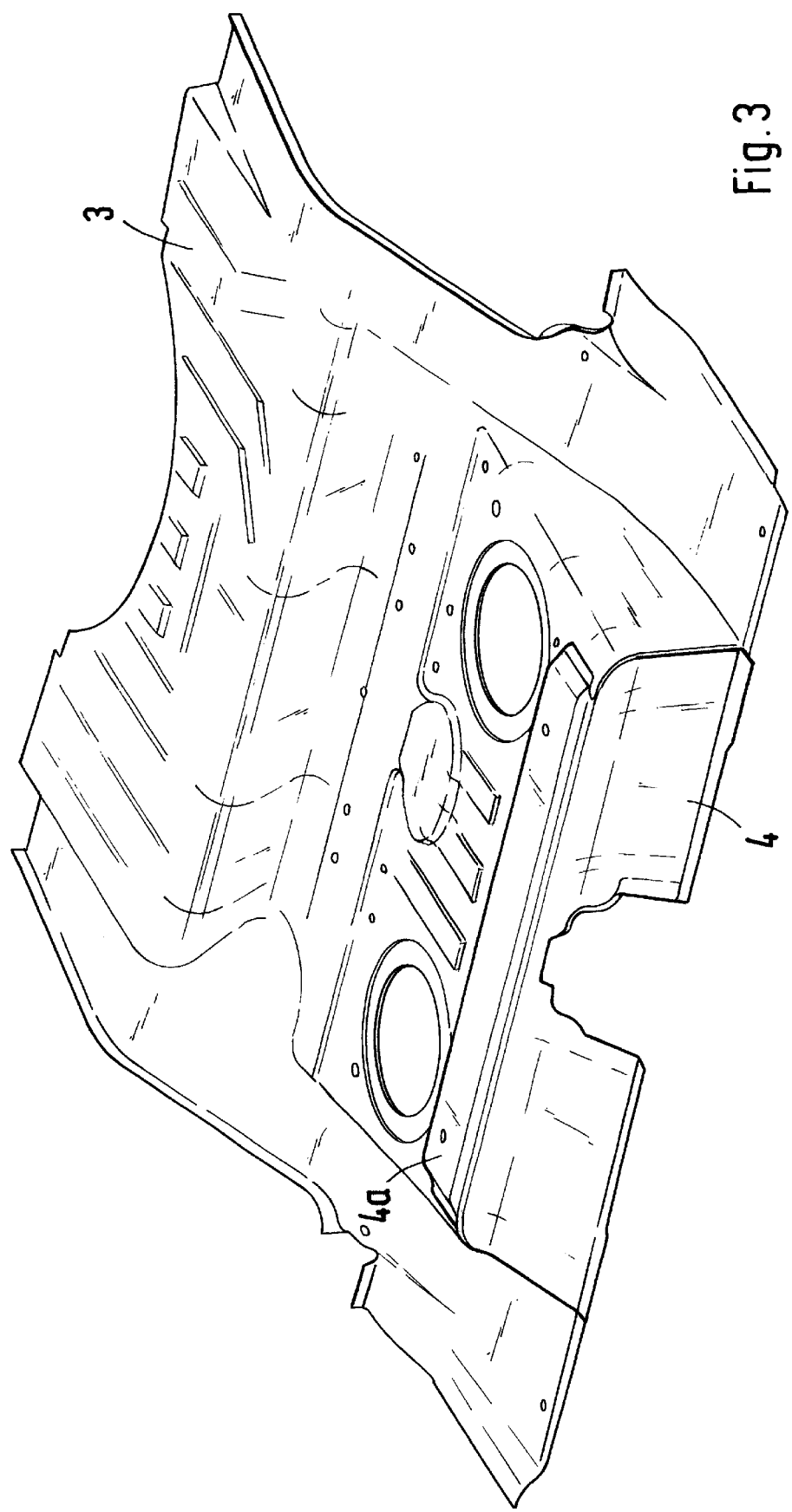
FIG. 3 shows a detail of an upper level heel sheet with rear floor sheet.
Figure 6:
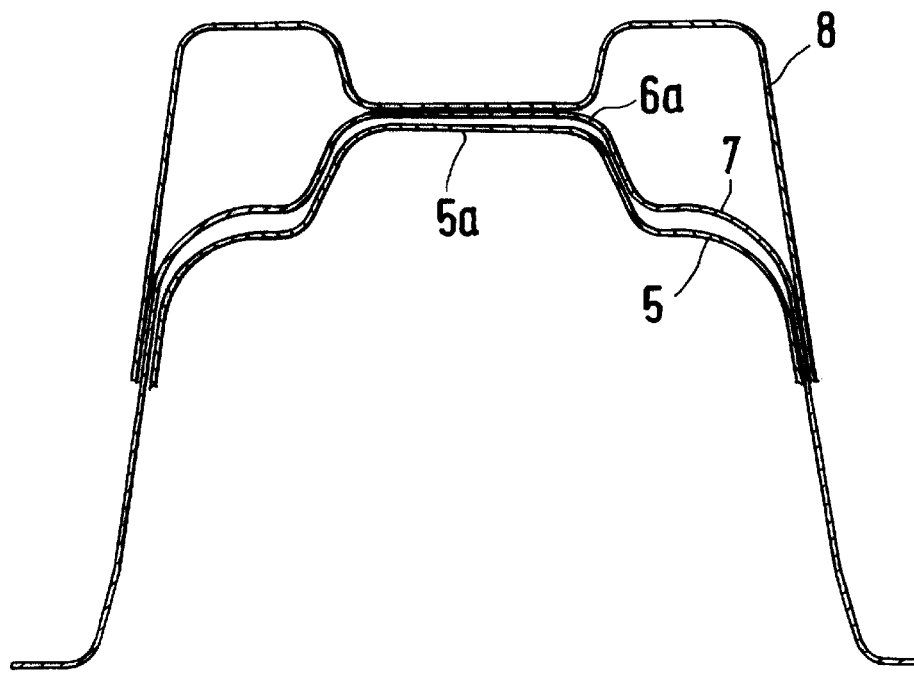
FIG. 6 shows a section according to line VI—VI of FIG. 5.
Figure 8:
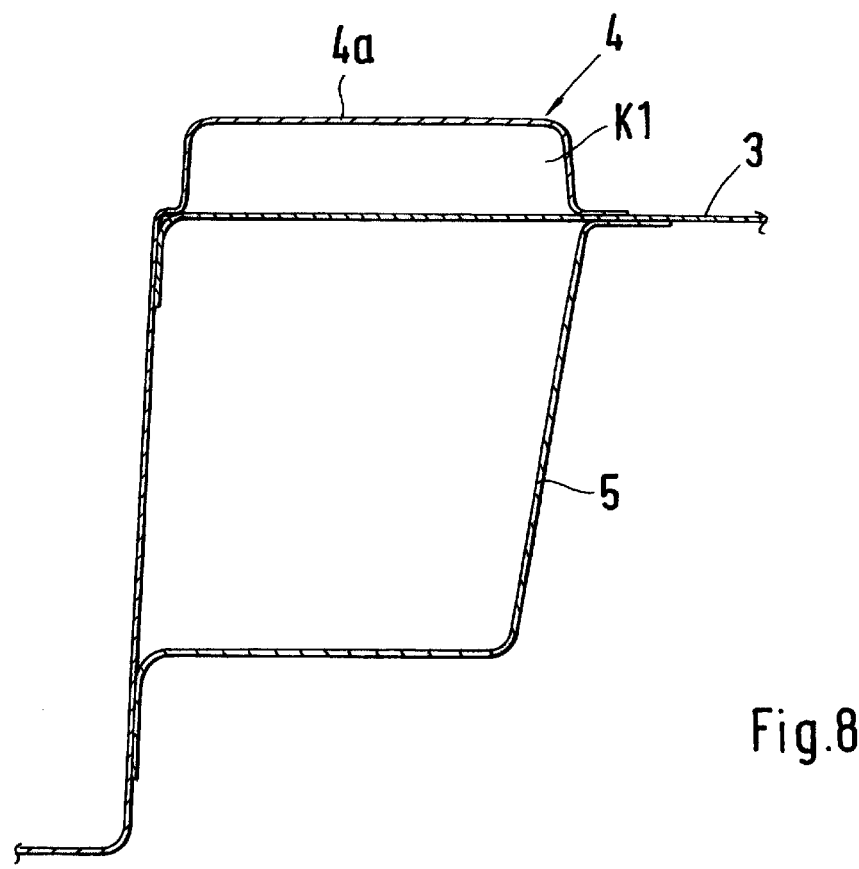
FIG. 8 shows a section according to line VIII—VIII of FIG. 2.

A floor installation structure 1 of a motor vehicle basically includes, viewed in the direction of travel F, a front floor sheet 2 and a rear floor sheet 3. These floor sheets 2 and 3 are connected with one another through connection elements 4, 5 and 6. The front floor sheet 2 has a central tunnel 7 with superimposed tunnel reinforcement 8 and with a tunnel junction reinforcement element 9 extending in the vehicular longitudinal direction.

The connection elements basically comprise an internal heel sheet 4 arranged crosswise in the vehicle and an external heel sheet 5 as well as a tunnel segment 6.

The internal heel sheet is an angular sheet shaped piece with a moved-up contoured locking segment 5a for the tunnel segment 6. The further external heel sheet 4, likewise, is an angular shaped piece with a top 4a U-shaped in cross section.

The heel sheets 4, 5 are connected with the rear floor sheet 3 and front floor sheet 2 through stops, for example by way of a point welding, and form a transversely running hollow support (H) with several chambers K1, K2 and K3.

A connection between the central tunnel 7 and the rear floor sheet 3 or the internal heel sheet 5 takes place through tunnel segment 6. This tunnel segment 6 has an angular cutout 10 which is braced on a leg 11 of the internal heel sheet 5 by straps 12, 13. End to end, the tunnel segment 6 is connected with the legs of the internal heel sheet 5 through additional straps and the like.

As represented in greater detail in FIGS. 4 and 7, the inner or internal heel sheet 5 has the moved-up locking segment 5a which has a contoured construction corresponding to tunnel segment 6 and upon which tunnel segment 6 is braced. In particular, locking segment 5a has a U-contour 5b in its top that is arranged in the corresponding U-contour 6a of tunnel segment 6 for the accommodation of tunnel segment 6.

The upper level or external heel sheet 4 has a cut out 15 corresponding to the cross section of tunnel segment 6 which encloses tunnel segment 6 and can also be connected with this.

The central tunnel 7 is inserted on tunnel segment 6 with its free end 7a and connected with this. For reinforcing the central tunnel 7, it is provided with tunnel reinforcement 8 which can be superimposed on the central tunnel 7. A tunnel junction reinforcement 9 joining on the free end 7a of the central tunnel 7 is provided. The connection elements thus form the transverse-running hollow support (H), and the tunnel segment 6 connects the central tunnel 7 with the hollow support (H) and is held with its one free end 6b in the hollow support (H) and with its other turned-away free end 6c in the central tunnel 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle with a floor installation structure comprising a central tunnel running longitudinally, which is connected with a floor transverse support of the structure through connection elements
    wherein the connection elements form a transverse-running hollow support unit, including plural chambers, with the floor installation structure, and a tunnel segment, which connects the central tunnel with the hollow support unit, is held with one free end in the hollow support unit and with a turned-away free end in the central tunnel.
2. A motor vehicle according to claim 1, wherein the hollow support unit has a lower level heel sheet, which is one of an angular heel sheet arranged beneath the floor installation structure and a back-lying heel sheet with a moved-up contoured locking segment arranged in a long central plane of the central tunnel, and an upper angular heel sheet arranged above a floor sheet, and the two heel sheets are connectable through stops with the floor installation structure as well as with each other.
3. A motor vehicle according to claim 1,
    wherein the tunnel segment has a U-shaped section with a projecting U contour section arranged in a bar, and
    wherein the tunnel segment has an angular cutout with mounting straps on legs and on a front face toward a lower level heel sheet.
4. A motor vehicle according to claim 2,
    wherein the tunnel segment has a U-shaped section with a projecting U contour section arranged in a bar, and
    wherein the tunnel segment has an angular cutout with mounting straps on legs and on a front face toward the lower level heel sheet.
5. A motor vehicle according to claim 1, wherein the tunnel segment is arranged inside a cutout of an upper heel sheet which has a shape corresponding to a cross section of the tunnel segment.
6. A motor vehicle according to claim 2, wherein the tunnel segment is arranged inside a cutout of the upper heel sheet which has a shape corresponding to a cross section of the tunnel segment.
7. A motor vehicle according to claim 3, wherein the tunnel segment is arranged inside a cutout of the upper heel sheet which has a shape corresponding to a cross section of the tunnel segment.
8. A motor vehicle according to claim 2, wherein the moved-up, contoured locking segment of the lower heel sheet has a contouring corresponding to a contour of the tunnel segment and is arranged form-lockingly within the tunnel segment.
9. A motor vehicle according to claim 4, wherein the moved-up, contoured locking segment of the lower heel sheet has a contouring corresponding to a contour of the tunnel segment and is arranged form-lockingly within the tunnel segment.
10. A motor vehicle according to claim 6, wherein the moved-up, contoured locking segment of the lower heel sheet has a contouring corresponding to a contour of the tunnel segment and is arranged form-lockingly within the tunnel segment.
11. A motor vehicle according to claim 1, wherein the central tunnel is connected with a superimposed contoured reinforcement to which a tunnel connection reinforcement element is joined, which ends on an upper heel sheet.
12. A motor vehicle according to claim 2, wherein the central tunnel is connected with a superimposed contoured reinforcement to which a tunnel connection reinforcement element is joined, which ends on the upper heel sheet.
13. A motor vehicle according to claim 3, wherein the central tunnel is connected with a superimposed contoured reinforcement to which a tunnel connection reinforcement element is joined, which ends on an upper heel sheet.
14. A motor vehicle according to claim 5, wherein the central tunnel is connected with a superimposed contoured reinforcement to which a tunnel connection reinforcement element is joined, which ends on an upper heel sheet.
15. A motor vehicle according to claim 8, wherein the central tunnel is connected with a superimposed contoured reinforcement to which a tunnel connection reinforcement element is joined, which ends on the upper heel sheet.
16. A motor vehicle according to claim 1,
    wherein a back-lying floor sheet is arranged between an upper heel sheet and a lower heel sheet, and
    wherein, between the floor sheet and the upper heel sheet, a first hollow space is formed, and between the floor sheet and the lower heel sheet, a second hollow space is formed, and between the floor sheet and the tunnel segment a third hollow space is formed.
17. A motor vehicle according to claim 2,
    wherein the back-lying floor sheet is arranged between the upper heel sheet and the lower heel sheet, and
    wherein, between the floor sheet and the upper heel sheet, a first hollow space is formed, and between the floor sheet and the lower heel sheet, a second hollow space is formed, and between the floor sheet and the tunnel segment a third hollow space is formed.
18. A motor vehicle according to claim 3,
    wherein a back-lying floor sheet is arranged between an upper heel sheet and the lower heel sheet, and
    wherein, between the floor sheet and the upper heel sheet, a first hollow space is formed, and between the floor sheet and the lower heel sheet, a second hollow space is formed, and between the floor sheet and the tunnel segment a third hollow space is formed.

19. A motor vehicle according to claim 5, wherein a back-lying floor sheet is arranged between the upper heel sheet and a lower heel sheet, and wherein, between the floor sheet and the upper heel sheet, a first hollow space is formed, and between the floor sheet and the lower heel sheet, a second hollow space is formed, and between the floor sheet and the tunnel segment a third hollow space is formed.

20. A motor vehicle according to claim 8, wherein the back-lying floor sheet is arranged between the upper heel sheet and the lower heel sheet, and wherein, between the floor sheet and the upper heel sheet, a first hollow space is formed, and between the floor sheet and the lower heel sheet, a second hollow space is formed, and between the floor sheet and the tunnel segment a third hollow space is formed.

21. A motor vehicle according to claim 11, wherein a back-lying floor sheet is arranged between the upper heel sheet and a lower heel sheet, and wherein, between the floor sheet and the upper heel sheet, a first hollow space is formed, and between the floor sheet and the lower heel sheet, a second hollow space is formed, and between the floor sheet and the tunnel segment a third hollow space is formed.

22. A floor structure for a vehicle, comprising:

a central tunnel running longitudinally, a floor transverse support of the floor structure, and connection elements which connect the central tunnel to the floor transverse support, the connection elements forming a transverse-running hollow support unit which has a plurality of chambers, wherein the connection elements include a tunnel segment which connects the central tunnel with the hollow support unit, the tunnel segment being held at one free end in the hollow support unit and at a turned-away free end in the central tunnel.

23. A floor structure according to claim 22, wherein the hollow support unit has a lower level heel sheet, which is one of an angular heel sheet arranged beneath the floor structure and a back-lying heel sheet with a moved-up contoured locking segment arranged in a long central plane of the central tunnel, and an upper angular heel sheet arranged above a floor sheet, and the two heel sheets being connectable through stops with the floor structure as well as with each other.

24. A floor structure according to claim 22, wherein the tunnel segment has a U-shaped section with a projecting U contour section arranged in a bar, and wherein the tunnel segment has an angular cutout with mounting straps on legs and on a front face toward a lower level heel sheet.

25. A floor structure according to claim 22, wherein a back-lying floor sheet is arranged between an upper heel sheet and a lower heel sheet, and wherein, between the floor sheet and the upper heel sheet, a first hollow space is formed, and between the floor sheet and the lower heel sheet, a second hollow space is formed, and between the floor sheet and the tunnel segment a third hollow space is formed.

26. A method of making a floor structure for a vehicle, comprising:

arranging a central tunnel running longitudinally, connecting a floor transverse support of the structure to the central tunnel via connection elements, the connection elements forming a transverse running hollow support unit having at least two chambers, and connecting the central tunnel with the hollow support unit via a tunnel segment, wherein the tunnel segment is held with one free end in the hollow support unit and with a turned-away free end in the central tunnel.

27. A method according to claim 26, wherein the hollow support unit comprises a floor sheet, an upper angular heel sheet, which is arranged above the floor sheet, and a lower angular heel sheet.

28. A method according to claim 27, wherein the lower heel sheet is arranged beneath the floor structure.

29. A method according to claim 27, wherein the lower heel sheet is a back-lying heel sheet with a moved-up contoured locking segment arranged in a long central plane of the central tunnel.

30. A method according to claim 27, wherein the heel sheets are connected via stops with the floor structure and each other.

31. A floor installation structure according to claim 22, wherein the hollow support unit comprises a floor sheet, an upper angular heel sheet, which is arranged above the floor sheet, and a lower angular heel sheet.

* * * * *